Patented July 12, 1927.

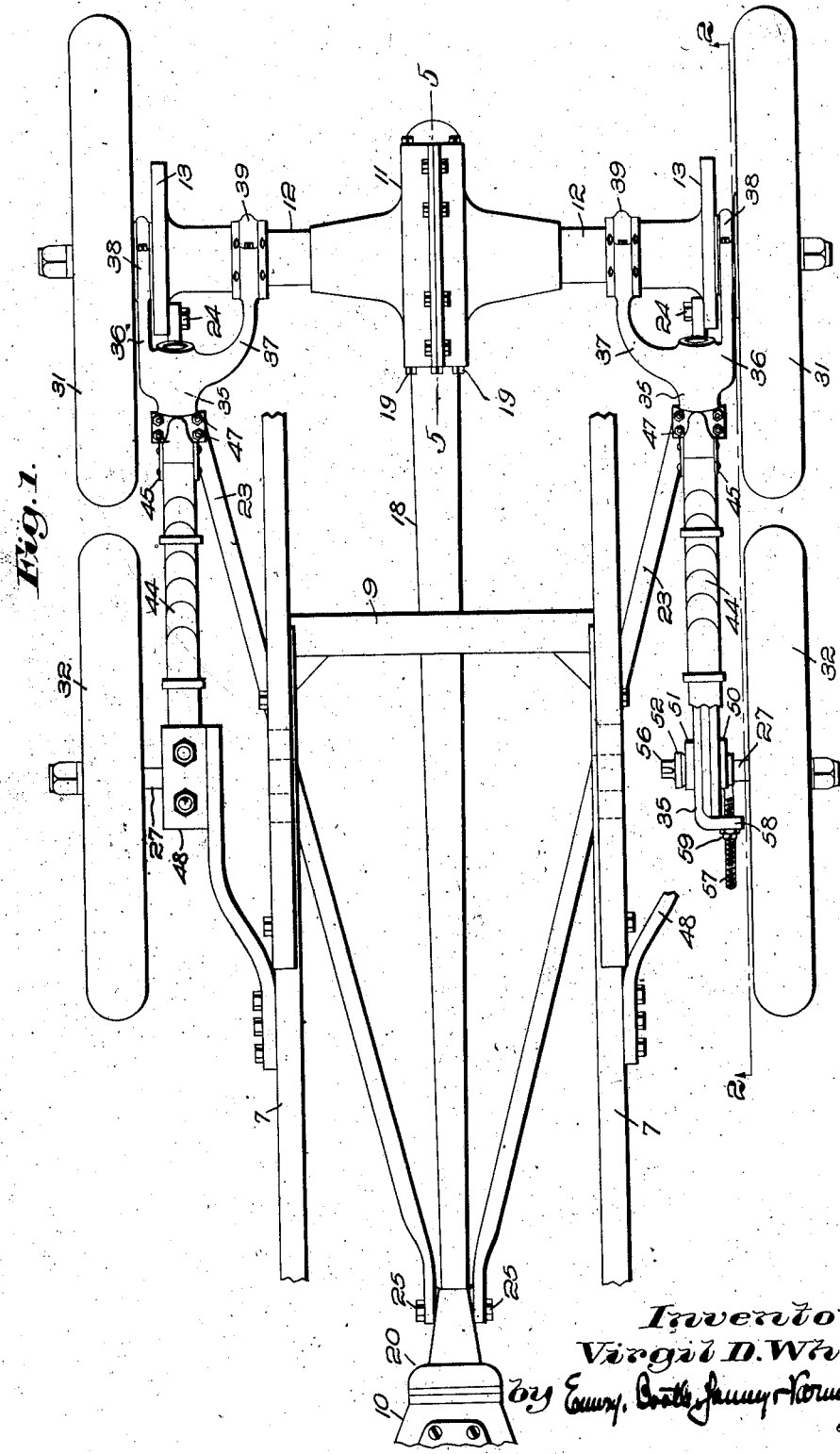

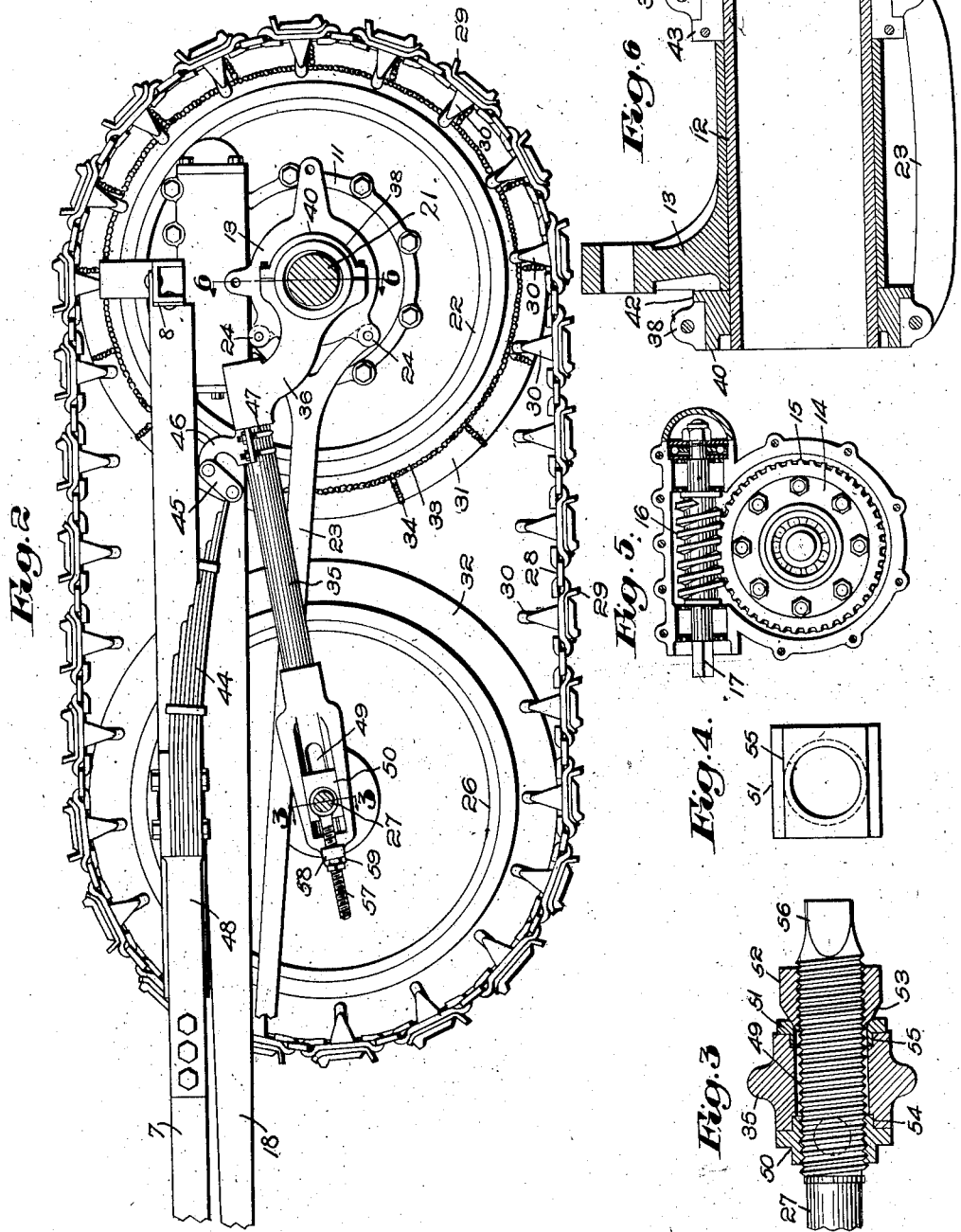

1,635,870

UNITED STATES PATENT OFFICE.

VIRGIL D. WHITE, OF WEST OSSIPEE, NEW HAMPSHIRE, ASSIGNOR TO SNOWMOBILE COMPANY, OF ROCHESTER, NEW HAMPSHIRE, A CORPORATION OF NEW HAMPSHIRE.

VEHICLE PROPELLING MECHANISM.

Application filed April 16, 1925. Serial No. 23,503.

This invention relates to a novel vehicle-propelling mechanism of the track-laying type, suitable for use in connection with ordinary motor cars to adapt them for use on snow and other surfaces, where sufficient traction and contact are not afforded by wheels, and where the wheels otherwise would sink down into the snow and render the motor car useless.

The invention will be best understood by reference to the following description, when taken in connection with the accompanying drawing of one specific embodiment thereof, while its scope will be more particularly pointed out in the appended claims.

In the drawings:

Fig. 1 is a plan of a portion of a motor vehicle having propelling mechanism embodying the invention, the endless tracks being omitted in this view, the better to illustrate the remainder of the mechanism;

Fig. 2 is a sectional view on line 2—2 of Fig. 1;

Fig. 3 is a sectional view on an enlarged scale on line 3—3 of Fig. 2;

Fig. 4 is a detail end view of one of the sliding blocks shown in Fig. 3;

Fig. 5 is a sectional view on line 5—5 of Fig. 1; and

Fig. 6 is a sectional view on an enlarged scale on line 6—6 of Fig. 2.

Referring to the drawings, and to the embodiment of the invention which is selected for exemplification, there is shown a portion of a motor vehicle having a main frame comprising longitudinal bars 7 (see Figs. 1 and 2), and transverse bars 8 and 9. This frame supports a power plant including a clutch and transmission having a housing, a portion of which is shown at 10 in Fig. 1.

The vehicle is provided with a rear axle of suitable construction, the one herein shown comprising a differential housing 11, two tubes 12 inserted therein and extending laterally therefrom, and two brake mountings 13, into which the other ends of the tubes extend. The differential housing encloses usual differential gearing, including a carrier 14 (see Fig. 5), to which is secured a gear such as a worm gear 15, which meshes with and is driven by a worm 16. The worm is driven by a usual longitudinal driving shaft, a portion of which is shown at 17, housed in a torque tube 18 (see Fig. 1), the rear end of which is secured by bolts 19 to the housing 11.

The front end of the torque tube is connected to the clutch and transmission housing 10 (see Fig. 1) by a usual universal joint 20, which permits the rear axle and torque tube to play up and down, and to turn about a longitudinal axis. The differential gearing transmits power in a well-known manner to two axle shafts 21, one of which is shown in section in Fig. 2, and by these shafts the rear wheels 22 are driven, as by being keyed to the shafts in a well-known manner. Brace rods 23, sometimes called radius rods, are secured at their rear ends by bolts 24 (see Fig. 1) to the brake mountings 13, while the front ends of said radius rods are secured to the other end of the torque tube by bolts 25. The vehicle as thus far described may be of any usual or suitable construction.

Forward of the rear wheels are auxiliary wheels 26 (see Fig. 2), which turn on and about spindles 27, and are independently mounted in a manner presently to be described. Associated with each rear driving wheel and its companion auxiliary wheel is an endless traction belt or track 28, having appropriate cleats 29, which afford good traction. To maintain the proper lateral relationship between the belt and the wheels, the belt herein is provided with a series of inwardly disposed projections, herein brackets 30, which embrace the usual tires, such as pneumatic tires 31 and 32 on the rear and auxiliary wheels. A practically non-slipping driving connection between the rear wheels and the traction belts is conveniently afforded by traction chains 33 about the tires, and having cross-chains 34 interspersed between the brackets 30. The auxiliary wheels are mounted for independent movement and adjustment, and the load is distributed between the rear and auxiliary wheels in a manner which will now be described, reference being had at first to Fig. 1.

Each wheel spindle is mounted on a carrier 35, appropriately supported on the rear axle, as by a pivotal joint coaxial with the latter, this being conveniently accomplished in the present example by providing each carrier or radius rod with two arms 36 and 37, at opposite sides, respectively, of the point of attachment of the brace or radius rod 23 to the associated brake mounting 13. The arms 36 and 37 present split bearings 38 and 39, which encircle collars 40 and 41 (see Fig. 6) about the axle tube 12. In assembling the parts, when the wheel is not in place, the collar 40 can be driven or forced onto the axle tube from the outer end of the latter. The collar 41, however, is split to enable it to be applied to the axle tube without removing the brake support from the latter. Herein, the collar 40 presents a shoulder 42, and the collar 41 presents two shoulders 43 to predetermine the position of the member 38 lengthwise of the axle. The described construction permits each auxiliary wheel to move vertically independently of the other, while its axis is maintained in parallelism with the axis of the rear axle. This has several advantages, among them being the fact that, in travelling over uneven surfaces, independent movement of the auxiliary wheels is permitted, thereby preventing twisting of the traction belts and distortion of any of the mechanism, and ensuring maximum traction of both belts at the same time, regardless of inequalities of the surface of the snow at the two sides of the machine. This is especially important when passing in and out of ruts, and in travelling over drifted snow, which might otherwise interfere with the traction. By constructing and arranging the auxiliary wheel carrier or radius member 35 so that its arms 36 and 37 straddle the point of attachment of the brace rod 23 to the brake-drum support 13, a strong and simple structure is produced, it is unnecessary to make any alterations in the forms of the usual brace-rods 23, and the auxiliary wheel carrier 35 is permitted to swing up and down to a very considerable extent, without danger of interference with the brace-rod 23.

Proper distribution of weight between the rear and auxiliary wheels is obtained by supporting the load-carrying frame intermediate the axes of the rear and auxiliary wheels, herein at a point somewhat nearer to the axis of the rear wheels than to that of the auxiliary wheels. Roughly speaking, the point of support is about one-third of the distance from the axis of the rear wheels to that of the auxiliary wheels, so that in a general way, about two-thirds of the load is carried on the rear wheels, and one-third on the auxiliary wheels. This is conveniently accomplished in the present example by the use of two quarter-elliptic springs 44, whose rear ends (see Fig. 2) are connected by shackles 45 to brackets 46, herein clamped about the auxiliary wheel carriers 35, as by U-shaped bolts 47. The front ends of these springs are rigidly secured to the frame, as by brackets 48 secured to the frame 7. Independent adjustment of the tensions of the traction belts is conveniently accomplished by providing each of the auxiliary wheel carriers 35 with a longitudinal slot 49 (see Fig. 2), which receives two sliding blocks 50 and 51 (see Fig. 3), one, herein the block 50, having screw-threaded engagement with the spindle, and the other presenting an abutment for a nut 52 threaded onto the spindle. The width of the slot is somewhat greater than the diameter of the spindle, and interference of the threads with the slot is thereby avoided. A conical projection 53 on the nut 52 is received in a correspondingly-shaped opening in the block 51, and serves to center the spindle and to take the load. Rotation of the blocks is prevented by providing them with reduced portions 54 and 55, which have a snug working fit in the slot 49. The appearance presented by the inner face of each block is exemplified in Fig. 4, which shows the inner face of the block 51. Herein, the inner end of the spindle 27 presents a polygonal head 56 for the application of a wrench thereto, to enable the spindle to be held against rotation, while the nut 52 is being rotated by the use of another wrench.

It should now be evident that, by simply loosening the nut 52, the spindle can be adjusted lengthwise of the slot. This adjustment is conveniently accomplished in the present example by the use of an adjusting screw 57 (see Fig. 2), formed on or appropriately secured to the block 50. In the present example, this screw extends loosely through an ear or lug 58 presented by the auxiliary wheel carirer 35, and one or more lock nuts 59, threaded onto the screw to adjustably limit rearward movement of the screw, and hence limit rearward movement of the associated auxiliary wheel. The traction belt can be tightened by first loosening the nut 52, then turning the nut or nuts 59 in the proper direction until the desired belt tension is attained, and finally tightening the nut 52.

It is important that each auxiliary wheel should accurately track with its companion rear wheel, thereby to ensure true running of the traction belts, and to prevent chafing of the tires by the yoke-like brackets which embrace them. In practice, it is found that wheels differ somewhat in dimensions, and more particularly that some are dished more than others. These variations can be compensated for very conveniently by adjusting the auxiliary wheels along their axes. This is effected by simply loosening the nut 52 to the necessary extent, and then turning the spindle 27 in the block 50 into which it is threaded. When the proper alignment of the wheels has been obtained, the nut 52 is tightened, and the wheel is securely held in its proper position.

Having thus described one embodiment of the invention, but without limiting myself thereto, what I claim and desire by Letters Patent to secure is:

1. In a motor vehicle, the combination of an axle, two driving wheels carried by said axle, a load sustaining frame, springs which support said frame and permit it to move up and down relatively to said wheels, brace members attached to said axle and moving therewith relatively to said frame as the latter moves up and down, two auxiliary wheels, and two auxiliary wheel carriers each attached to said axle intermediate the outer side of said frame and the adjacent wheels and intermediate the associated brace member and the adjacent driving wheel adjacent the inner side of the latter.

2. In a motor vehicle, the combination of an axle, two driving wheels carried by said axle, a load-sustaining frame, brace members attached to said axle and moving therewith relatively to said frame, two auxiliary wheels, and two auxiliary wheel carriers each attached to said axle intermediate the associated brace member and the adjacent driving wheel adjacent the inner side of the latter, said frame being supported by said wheel carriers.

3. In a motor vehicle, the combination of an axle, two driving wheels carried by said axle, a load-sustaining frame, forwardly extending braces attached to said axle, two auxiliary wheels forward of said driving wheels, and two forwardly extending auxiliary wheel carriers flexibly attached to said axle each between its associated brace and the adjacent driving wheel.

4. In a motor vehicle, the combination of an axle, two driving wheels carried by said axle, a load sustaining frame, two braces flexibly connecting said axle with said frame, two auxiliary wheels, two auxiliary wheel carriers flexibly attached to said axle, each between its associated brace and the adjacent driving wheel, and spring means interposed between said frame and said wheel carriers and supporting the former on the latter.

5. In a motor vehicle, the combination of two pairs of wheels, one in advance of the other, an axle which carries the wheels of one pair, driving connections between the wheels of one pair and the wheels of the other pair, means to predetermine the position of one pair of wheels with reference to the other pair, longitudinally of the vehicle, said means including two members, each presenting two arms attached to said axle, and means to predetermine the position of said axle longitudinally of the vehicle, the last-mentioned means including two members, each attached to said axle between the two arms of one of the first-mentioned members.

6. In a motor vehicle, the combination of an axle comprising a housing, a pair of driving wheels carried by said axle, a second pair of wheels, driving connections between said driving wheels and said second wheels, respectively, two members attached to said housing to predetermine the position of said axle longitudinally of the vehicle, and two members to predetermine the position of said second wheels longitudinally of the vehicle, each of the last-mentioned members presenting two arms pivoted on said axle at opposite sides, respectively, of the point of attachment of the corresponding first-mentioned member.

7. In a motor vehicle, the combination of an axle comprising a housing, a pair of driving wheels carried by said axle, a second pair of wheels, driving connections between said driving wheels and said second wheels, respectively, a frame supported in part by said driving wheels and in part by said second wheels, two members connecting said housing to said frame to predetermine the position of said axle longitudinally of the vehicle, and two members to predetermine the position of said second wheels longitudinally of the vehicle, each of the last mentioned members presenting two arms pivoted on said axle at opposite sides, respectively, of the point of attachment of the corresponding first-mentioned means.

8. In a vehicle, the combination of a rear axle, a pair of driving wheels carried by said axle, a pair of auxiliary wheels, driving connections for driving said auxiliary wheels from said driving wheels, a pair of auxiliary wheel carriers carried by said axle, a pair of auxiliary wheel spindles carried by said carriers, and means providing for adjustment of said spindles and said auxiliary wheels forward and backward with relation to said rear axle, said means including adjusting screws disposed forward of said spindles.

9. In a vehicle, the combination of a rear axle, a pair of driving wheels carried by said axle, a pair of auxiliary wheels, driving connections for driving said auxiliary wheels from said driving wheels, a pair of auxiliary wheel carriers carried by said axle and presenting guides, a pair of auxiliary wheel spindles carried by said carriers, spindle adjusting screws disposed transversely of said spindles and extending through said guides, means to prevent rotation of said screws, and adjusting nuts threaded onto said screws to adjust the same lengthwise.

In testimony whereof, I have signed my name to this specification.

VIRGIL D. WHITE.